(12) United States Patent  
Johnston

(10) Patent No.: US 9,292,948 B2  
(45) Date of Patent: Mar. 22, 2016

(54) DRAWING METHOD

(75) Inventor: Rory A. Johnston, Redmond, WA (US)

(73) Assignee: Nintendo Co., Ltd., Kyoto (JP)

(*) Notice: Subject to any disclaimer, the term of this patent is extended or adjusted under 35 U.S.C. 154(b) by 143 days.

(21) Appl. No.: 13/303,529

(22) Filed: Nov. 23, 2011

(65) Prior Publication Data

US 2012/0320061 A1    Dec. 20, 2012

Related U.S. Application Data

(60) Provisional application No. 61/496,958, filed on Jun. 14, 2011.

(51) Int. Cl.
*G06T 11/60* (2006.01)

(52) U.S. Cl.
CPC .................................... *G06T 11/60* (2013.01)

(58) Field of Classification Search
CPC ..................... G06F 3/04883; G06F 3/04886
See application file for complete search history.

(56) References Cited

U.S. PATENT DOCUMENTS

| | | |
|---|---|---|
| 6,155,926 A | 12/2000 | Miyamoto et al. |
| 2002/0050982 A1* | 5/2002 | Ericson .................... 345/173 |
| 2002/0065133 A1* | 5/2002 | Nagayama ................. 463/32 |
| 2003/0231219 A1* | 12/2003 | Leung ...................... 345/863 |
| 2004/0259637 A1 | 12/2004 | Kimura et al. |
| 2006/0071915 A1* | 4/2006 | Rehm ....................... 345/173 |
| 2007/0202949 A1 | 8/2007 | Kawade et al. |
| 2010/0031203 A1* | 2/2010 | Morris et al. ............ 715/863 |
| 2011/0246875 A1* | 10/2011 | Parker et al. ............ 715/702 |

* cited by examiner

*Primary Examiner* — Ke Xiao  
*Assistant Examiner* — Raffi Isanians  
(74) *Attorney, Agent, or Firm* — Nixon & Vanderhye, P.C.

(57) ABSTRACT

A drawing system and method is provided for drawing objects and maps in a virtual world editor. The drawing method performs object checking to determine if a particular object can be drawn in the virtual world editor. When drawing the object, if the drawing method for the object does not satisfy a specific condition, the method will not allow the object to "set." If the object satisfies the specific condition, the method will allow the object to set and be drawn onto the terrain. If the object is obstructed as it is being drawn, the drawing system will adjust the object so it is appropriately drawn in the software environment.

26 Claims, 9 Drawing Sheets

*Exemplary Illustrative Game Play Platform*

*Exemplary Illustrative Game Play Platform Block Diagram*

*Exemplary Illustrative Game Play Platform*

*Exemplary Illustrative Game Play Platform Block Diagram*

DRAWING METHOD

CROSS-REFERENCE TO RELATED APPLICATIONS

This application claims the benefit of priority from provisional application No. 61/496,958 filed Jun. 14, 2011, the contents of which are incorporated herein by reference.

BACKGROUND

Traditional video software systems allow an object to move in a 2-D or 3-D environment. In traditional 2-D environments, the object will be navigated by a user where the user can move the object in the X and Y directions. As the object moves in the environment, the object can encounter certain objects disposed within the virtual environment. For example, the object may encounter a hill, bridge, river, wall, or even another object.

Most software environments create these terrains during development of the environment. That is, a developer will create the various maps and objects on the map that a main object will encounter. However, some software environments allow users to be their own developer and allow them to create particular objects and entire environment terrains.

In software environments that allow the user to create their own objects or environment maps, the software environment will typically allow users to select objects to place onto the terrain or to "draw" the objects on the screen. This allows the user to draw particular objects that will be a part of the environment terrain.

However, this "free drawing" mode allows a user to create any objects that may not make sense in certain portions of the terrain or may cause the software environment to function unnaturally. As such, it is desirable to have a drawing method that takes into account these drawbacks.

BRIEF SUMMARY

A drawing system and method is provided for drawing objects and maps in a virtual world editor. The drawing method performs object checking to determine if a particular object can be drawn in the virtual world editor. When drawing the object, if the drawing method for the object does not satisfy a specific condition, the method will not allow the object to "set." If the object satisfies the specific condition, the method will allow the object to set and be drawn onto the terrain. If the object is obstructed as it is being drawn, the drawing system will adjust the object so it is appropriately drawn in the software environment.

A drawing method for drawing objects on a display of a user interface device is provided. The drawing method comprises setting a drawing start point for drawing a drawing object, setting a drawing end point for drawing the drawing object, drawing the drawing object from the drawing start point towards the drawing end point, determining if a path from the drawing start point to the drawing end point for drawing the drawing object is obstructed, and preventing the drawing object from being drawn to the drawing end point if the path for drawing the drawing object is obstructed.

The drawing method further comprises positioning a first object of a first type on the display, positioning a second object of a second type on the display, the second object being at a different position than the first object, and positioning a third object of the first type on the display, the third object being at a different position than both the first and second objects, where the first and second types are different from each other.

A non-transitory computer-readable storage medium is provided having computer readable code embodied therein for executing the drawing method described in the preceding paragraphs.

A user interface apparatus is also provided where the user interface apparatus comprises a display for drawing a drawing object, a memory for storing a program for drawing the drawing object on the display, a drawing device for drawing the drawing object on the display, and one or more processors configured to draw the drawing object on the display. The one or more processors are further configured to set a drawing start point for drawing a drawing object, set a drawing end point for drawing the drawing object, draw the drawing object from the drawing start point towards the drawing end point, determine if a path from the drawing start point to the drawing end point for drawing the drawing object is obstructed, and prevent the drawing object from being drawn to the drawing end point if the path for drawing the drawing object is obstructed.

The one or more processors in the user interface apparatus are further configured to position a first object of a first type on the display, position a second object of a second type on the display, the second object being at a different position than the first object, and position a third object of the first type on the display, the third object being at a different position than both the first and second objects, where the first and second types are different from each other.

Another drawing method for drawing objects on a display of a user interface device is provided. The drawing method comprising drawing a grid-shaped area on the display having a horizontal and a vertical coordinate space, positioning a first object having a first type in a first coordinate space in the grid-shaped area, positioning a second object having a second type in a second coordinate space in the grid-shaped area, positioning a third object having the first type in a third coordinate space in the grid-shaped area, drawing a drawing object from the first coordinate space to the third coordinate space, and preventing the drawing object from being drawn to the third coordinate space if a path for drawing the drawing object is obstructed.

In a non-limiting, example embodiment the first object represents the drawing start point and the third object represents the drawing end point, and the second object is in a path between the first and third object.

In another non-limiting, example embodiment the drawing object will be prevented from drawing from the first object to the third object if an object of a different type obstructs a path between the first object and the third object.

In a further non-limiting, example embodiment the drawing object will not draw past the second object as the drawing object is being drawn toward the third object.

In another non-limiting, example embodiment the drawing of the drawing object will be completed when the drawing object draws from the first object to the third object and the first and third objects are of a same type.

In yet another non-limiting, example embodiment the first object, the second object, and the third object are selected from a menu.

In another non-limiting, example embodiment the drawing object will not be drawn past the second coordinate space when the first object and the second object are of a different type.

In other non-limiting, example embodiments multiple drawing objects can be drawn in the grid-shaped area, and after all drawing objects are drawn in the grid-shaped area, the grid-shaped area is removed from the display and the drawing objects are superimposed on a background of a game image.

In yet another non-limiting, example embodiment one or more player characters traverse the multiple drawing objects in a game using the background and the multiple drawing objects in the game image.

DETAILED DESCRIPTION

Figure 1A:
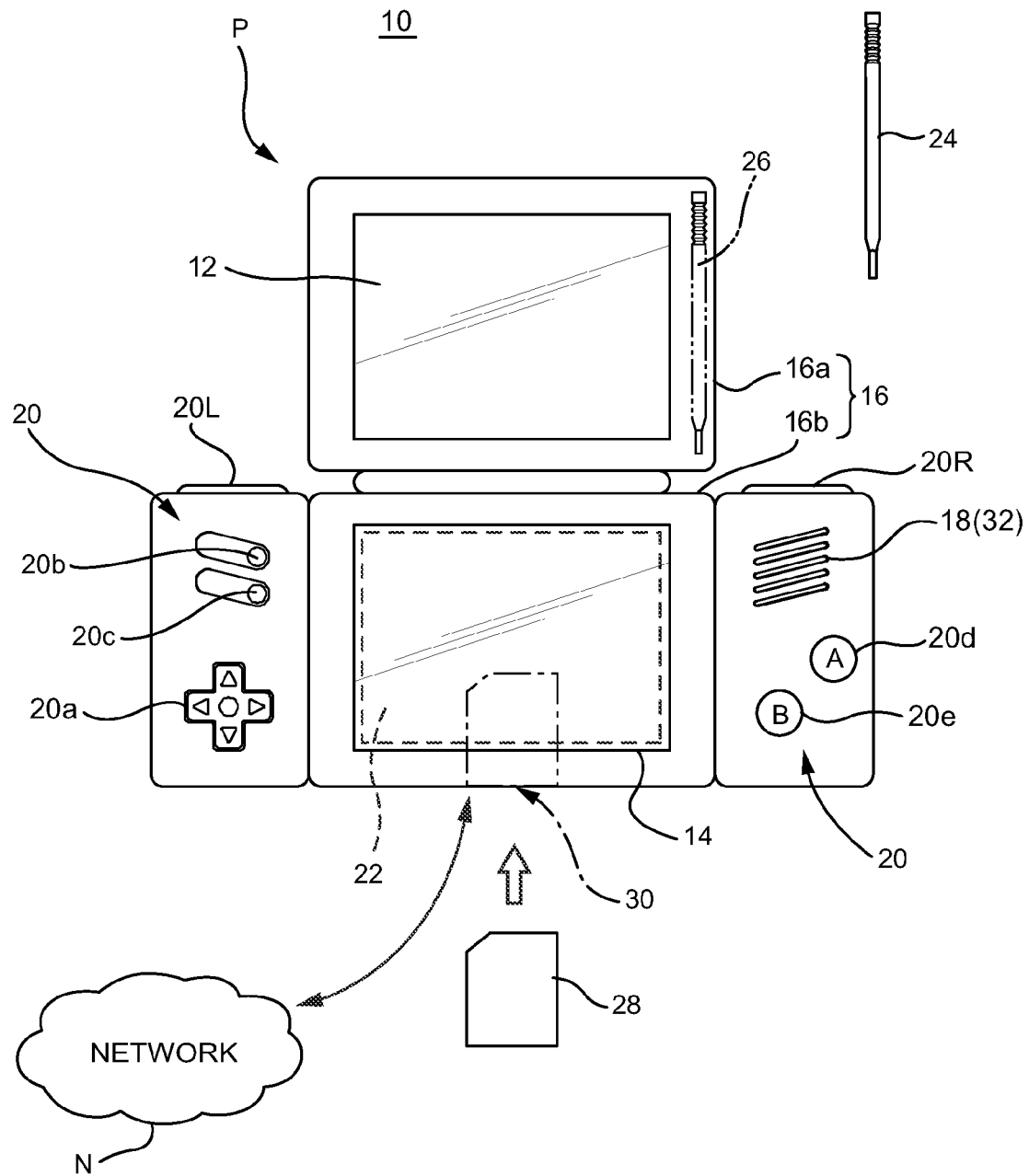
FIG. 1A is an exemplary external view of an exemplary illustrative non-limiting game apparatus for executing a game program.

In FIG. 1A, is an exemplary illustrative non-limiting user interface apparatus 1 that can be used for implementing the drawing method described above. In one exemplary illustrative non-limiting implementation, system 10 may comprise a Nintendo DS portable handheld videogame system including a 3D graphics generator capable of generating complex texture-mapped displays of characters interacting with a 3D world from any desired viewpoint.

In the exemplary non-limiting illustrative implementation shown, user interface device 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 1A. The operation switch section 14 also includes a direction indication switch (cross key) 14c, a start switch 14d, and a select switch 14e which are attached to one main surface of the side section of the lower housing 18a to the left of the second LCD 12 as seen in FIG. 1A. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 1A) of the second LCD 12, a touch panel 13 (surrounded by the dashed line in FIG. 1A) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole (an area represented by the two-dot chain line in FIG. 1A) is formed when necessary for accommodating the stylus 16 for operating the touch panel 13. In a part of one surface of the lower housing 18a, a cartridge insertion section (an area represented by the one-dot chain line in FIG. 1A) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18b inner to the cartridge insertion section has a built-in connecter (see FIG. 1B) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 1B:
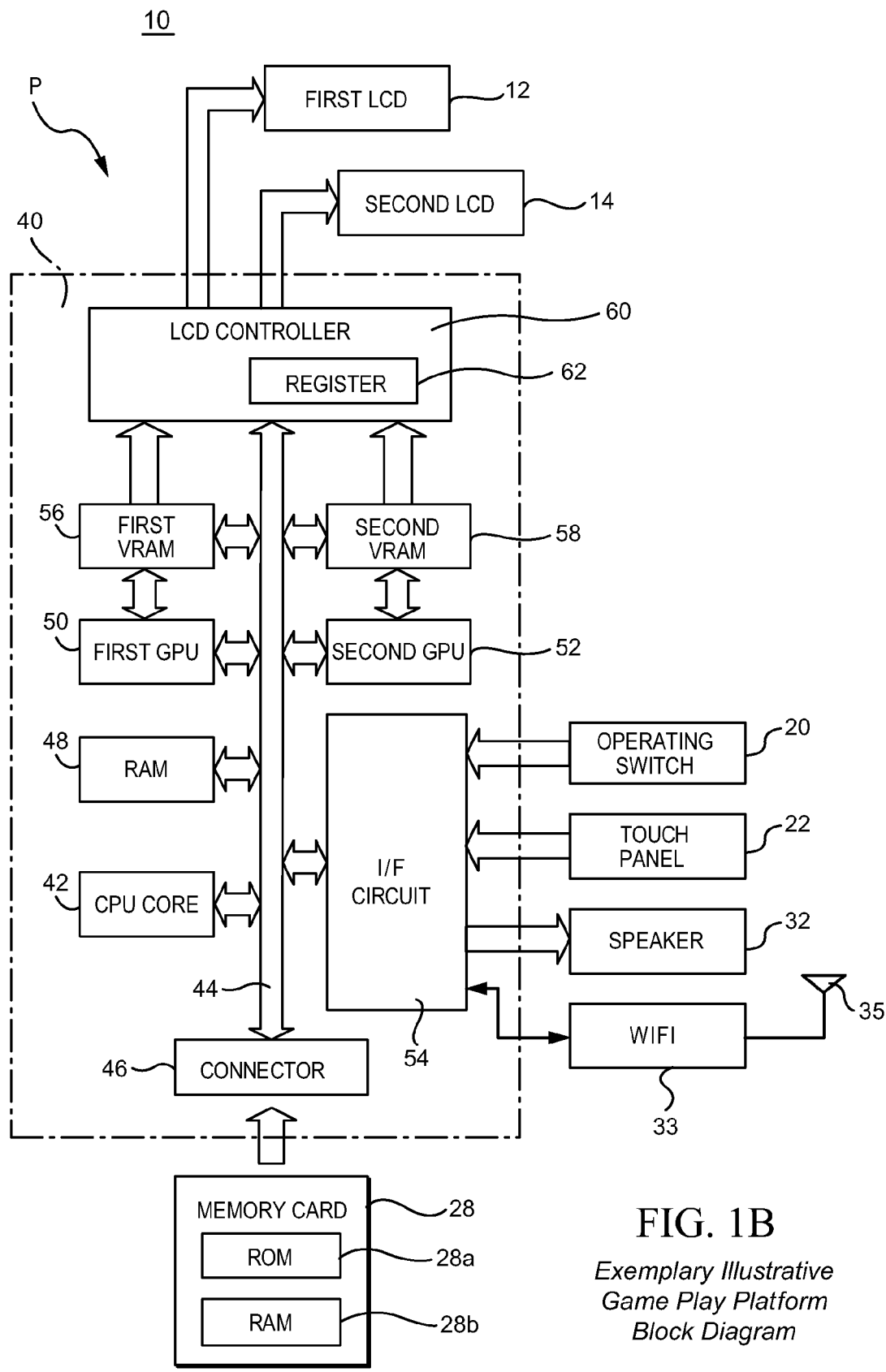
FIG. 1B is a block diagram showing an internal structure of the exemplary game apparatus.

Next, with reference to FIG. 1B, an internal structure of the user interface apparatus 1 will be described. FIG. 1B is a block diagram showing the internal structure of the user interface apparatus 1.

In FIG. 1B, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the user interface apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dot×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

The virtual world editor, in an exemplary embodiment, is implemented in the user interface apparatus as described above. However, it should be appreciated that the virtual world editor is not limited to this apparatus and can be implemented on any computing device, such as a personal computer, for example.

The following system can edit the virtual world using a grid display to place objects on and create connections between the objects. However, it should be appreciated that the editor is not limited to a grid and can be any sort of display for editing visual objects and visual terrains.

Figure 2:
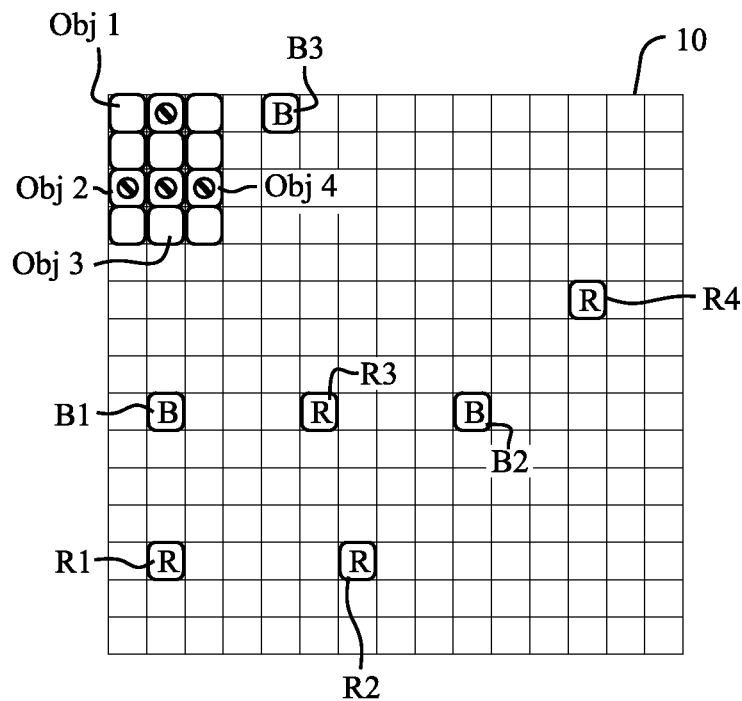
FIG. 2 illustrates a diagram example of an embodiment of the present system.

FIG. 2 shows an example diagram of a grid display 10 for adding and editing virtual objects in a virtual world editor. In this grid-shaped display 10, various objects are placed onto the display 10 so that a user can add them to the virtual world environment. Virtual Objects OBJ1-4 are shown being placed in the upper left hand portion of the display 10. An object can be selected from a menu of objects and can be placed onto a position on the display 10. This can be accomplished by entering the menu (or inventory of objects) by clicking on a menu button using a stylus and then selecting the particular object to be placed on the screen. Once the object is selected, a user can press and release the object onto the display 10 by tapping the area where the user would like to dispose the object. So for example, the user may select Virtual Object OBJ1 from an object inventory and then by tapping the display the user can dispose Virtual Object OBJ1 onto the display.

Virtual Objects R1-R4 and B1-B3 are also disposed on the display 10 and can represent drawing starting and ending points. In an exemplary embodiment, a user can use a drawing object, such as the stylus shown in FIG. 5, for example, and click on a virtual object to begin drawing from a starting point to an ending point. For example, a user can begin drawing a line by tapping object R1. By dragging the stylus across the display 10, the line will extend from R1 towards a desired ending point. For example, the user can draw a line to R2 by tapping on R1 and dragging the stylus to R2. Put another way, the user can press the object R1 and drag across the display 10 to form a line to the object R2. As explained below, as long as certain conditions are met, the line will "set" and draw at R2 and a line will be formed between R1 and R2. It should also be appreciated that some objects can be placed anywhere on the display without any particular base support (i.e. floating).

In the drag based drawing approach, certain restrictions can be imposed upon the drag depending upon the object starting point. For example, in a non-movement restriction based starting point, the user can press and drag a line in both the horizontal and vertical directions in a free form drag manner. In a drag where the starting object type restricts drawing to a horizontal or vertical movement, the movement will be restricted to the "left" or "right" directions and the "up" or "down" directions, respectively. As explained below, other restrictions on the navigation of the dragged line also restrict how the line is drawn.

It should also be appreciated that in addition to adding and drawing objects in the virtual environment, objects can be modified as well. For example, objects can be erased, moved, and even flipped.

The erase tool removes and erases an object from the display 10. In grid spaces that contain an object, a user can use the stylus, for example, and press and release the stylus on the portion of the grid that contains the object. So for example, if a user clicked on Object OBJ1 when using the erase tool, the Object OBJ1 will be removed from the display. In another example embodiment, if the display 10 contains a base floor (which is a special object type in the virtual world environment), and a surface object is erased from the base floor, the default base floor object included in a template re-appears. That is, the base floor portion does not actually erase but reverts back to a template base floor portion.

Another method of using the erase tool relates to dragging the drawing object across the display 10 instead of pressing and releasing. When performing a drag-based erase, the stylus can be pressed, held, and dragged from a grid position over the display 10. A visible select box draws over the objects that the stylus completely overlaps as it is being dragged. Upon release, any object which is capable of being erased is removed from the canvas. In an example embodiment, the select box is a rectangular shape. Of course, the select box is not limited to a rectangular shape and can be a square, circle, or any particular polygon.

Another manipulation technique involves moving objects. The move tool allows objects to be translated around the canvas. One method of moving an object involves a single click on the object on the display 10. So for example, if the Object OBJ1 is clicked on when the move tool is activated, the Object OBJ1 is highlighted indicating that it is currently selected. The user can then drag the Object OBJ1 using the stylus and the Object OBJ1 will follow the movement of the stylus across the display 10. When the user releases the Object OBJ1, provided the object is released on a valid space on the display 10, the object is moved to the new position. If the grid space on the display 10 is considered invalid, the object would return to the location it occupied before the attempt to move the object. In another example embodiment, regarding objects that are considered base floors, if a surface object is not a default object from the base floor, the object clicked on becomes highlighted indicating that it is currently selected. It can then be moved in the same manner described above.

Another technique using the move tool involves a dragging technique. Similar to the dragging technique for the erase tool, the user can drag the stylus across the display 10 by pressing, holding, and dragging from a grid position over the display 10. A visible select box draws over the objects that the stylus completely overlaps as it is being dragged. Upon release, any object which is capable of being moved is selected and moved to correspond to the motion of the stylus. So for example, Objects OBJ2-4 can all be selected using the drag method, and collectively moved across the display. Provided they are moved to valid grid positions, the system will translate Objects OBJ2-4 across the display to the new position.

Yet another object manipulation technique involves flipping the object. The flip tool allows objects containing a flip attribute to transform horizontally or vertically. When initiated, objects that are not capable of flipping dim-out in order to let the user focus on objects that are capable of flipping. So for example, a user may wish to flip Object OBJ4. Using the flip tool, provided the object is capable of being flipped, the user can press and release on the Object OBJ4 and the object will flip either horizontally or vertically on the display 10. For example, the object may flip or rotate 90 degrees so that the object is now horizontal instead of vertical.

Figure 3:
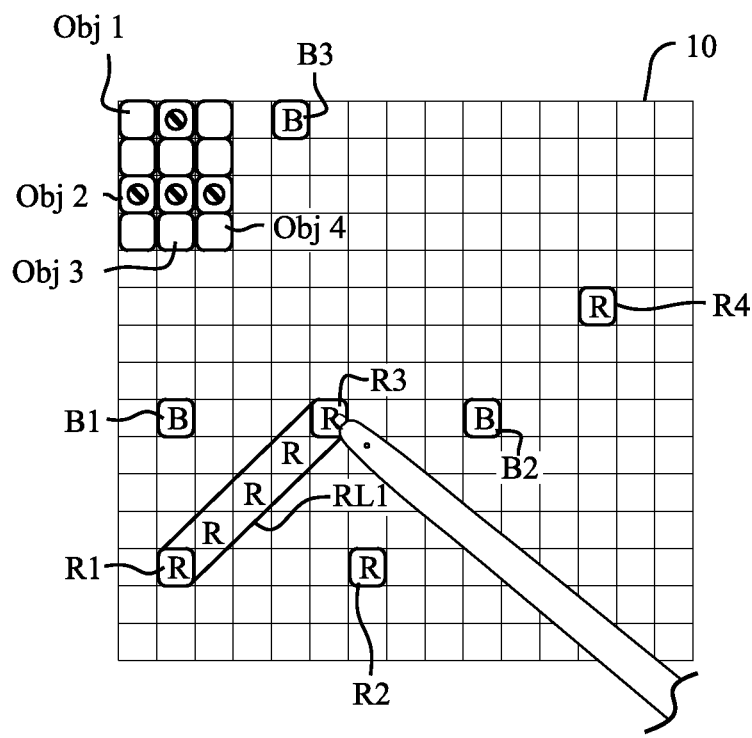
FIG. 3 illustrates another diagram example of an embodiment of the present system.

FIG. 3 shows another diagram example of the display 10. In FIG. 3, a user is drawing a line structure from a starting object to an ending object. In this example, the starting object R1 provides the base for the drawing line RL1. The user begins drawing the drawing line RL1 by pressing the object R1 on the display 10. The user can then drag the stylus towards other objects on the display 10. In this example, the user drags the stylus towards object R3. As the stylus moves towards the object R3, the drawing line RL1 extends farther from the object R1 towards object R3. That is, the drawing line RL1 gets longer as it extends toward object R3.

In an exemplary embodiment, the drawing line RL1 will be temporarily displayed as the user drags the stylus and will not "set" and become a fixed structure on the display until the user drags it to an appropriate location. In the present system, the drawing line RL1 will set if specific conditions are met. In this example, the starting and ending points must be of a same type. So for example, because object R1 and object R3 are of type "R," the drawing line RL1 will "set" and become a fixed structure on the display until the user removes or erases the drawing line RL1. It should be appreciated that once the drawing line RL1 is set, the user can tap either object R1 or object R3 to initiate the removal of the drawing line RL1. The user can also use the erase tool, as mentioned above, to remove the drawing line RL1.

Figure 4:
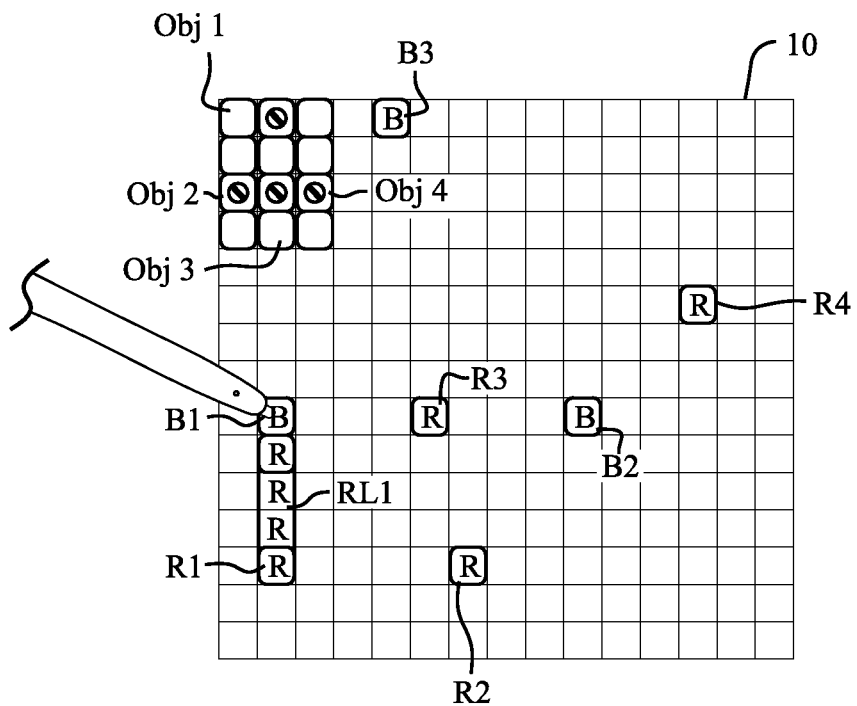
FIG. 4 illustrates another diagram example of an embodiment of the present system.

FIG. 4 shows another diagram example of the user drawing a line on the display 10. In this example, the user has pressed on the starting point at object R1 and is attempting to draw the drawing line RL1 to connect with the object B1. As a specific condition for connecting the drawing line RL1, in this example, the objects must be of the same type. As the object R1 is of type "R" and the object B1 is of type "B," the objects are not of the same type and the user will not be able to connect drawing line RL1 with object B1 using object R1 as a starting point.

Figure 5:
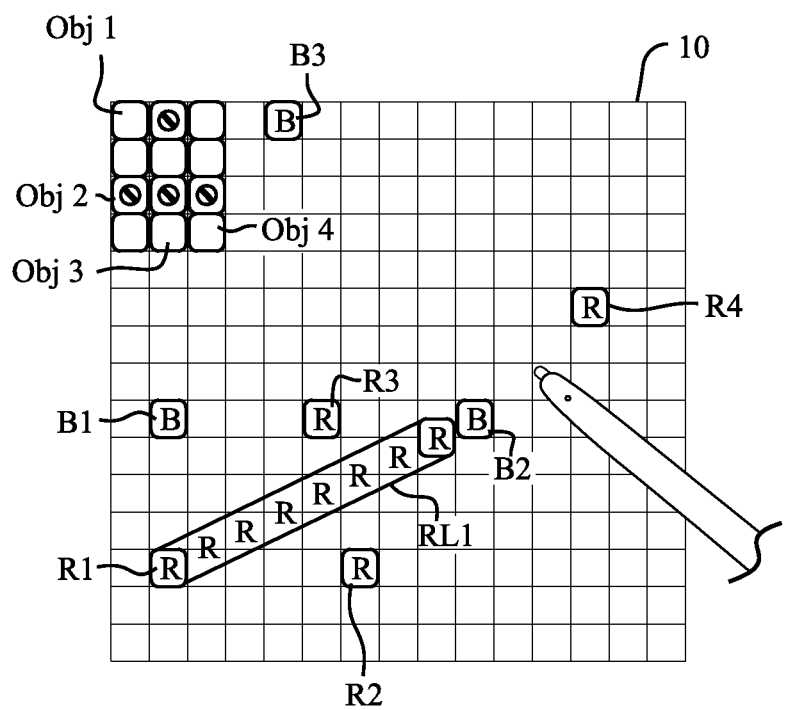
FIG. 5 illustrates another diagram example of an embodiment of the present system.

FIG. 5 shows another diagram example of the user drawing a line on the display 10. In this example, the user is attempting to connect the object R1 with the object R4. The user can begin drawing by pressing the stylus on object R1 and then drag the stylus towards object R4. In this example, the path of the drawing line RL1 will be obstructed by the object B2. So even though the user may have the stylus positioned at or near object R4, the drawing line RL1 will be "stopped" or "truncated" at B2. In this sense, the object B2 serves as a sort of barrier that the drawing line cannot be drawn past to reach object R4. The only way the user can connect object R1 with object R4 is to remove the object B2 from the display 10, in a manner as described above.

Figure 6:
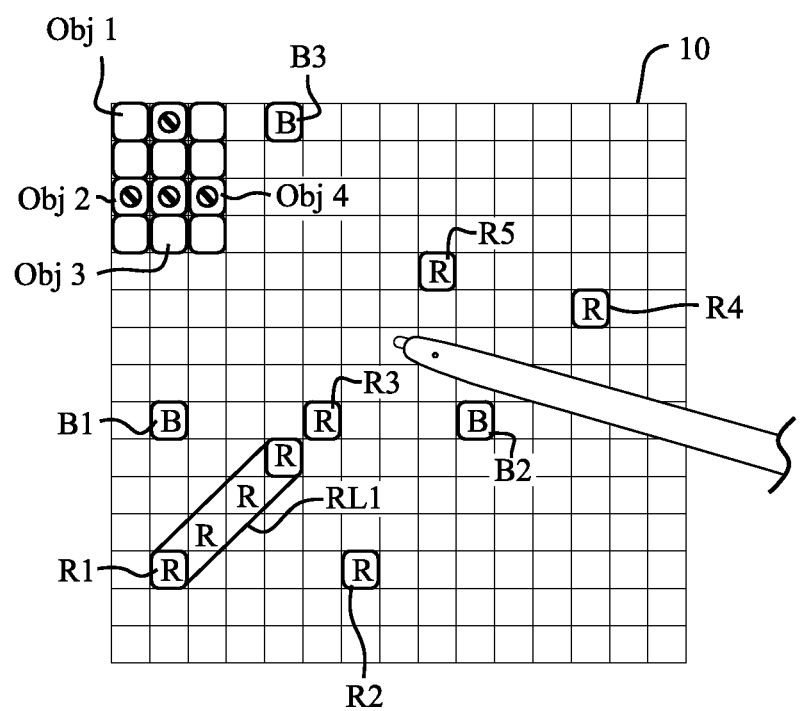
FIG. 6 illustrates another diagram example of an embodiment of the present system.

FIG. 6 shows yet another diagram example of the user drawing a line on the display 10. In this example, the user is attempting to draw the drawing line RL1 from object R1 to object R5. As such, the user has dragged the stylus at or near object R5. However, like the example in FIG. 5, the drawing line RL1 is being blocked by an intervening object. Even though object R3 is of the same type as object R1, because the user is attempting to "bypass" the object and draw through it, the system will block the path of the drawing line RL1 similar to how it was blocked in the example shown in FIG. 5. Therefore, the drawing line RL1 will appear "stopped" or "truncated" at object R3. The user can clear the path to object R5 by removing object R3, under any of the methods described above.

Figure 7:
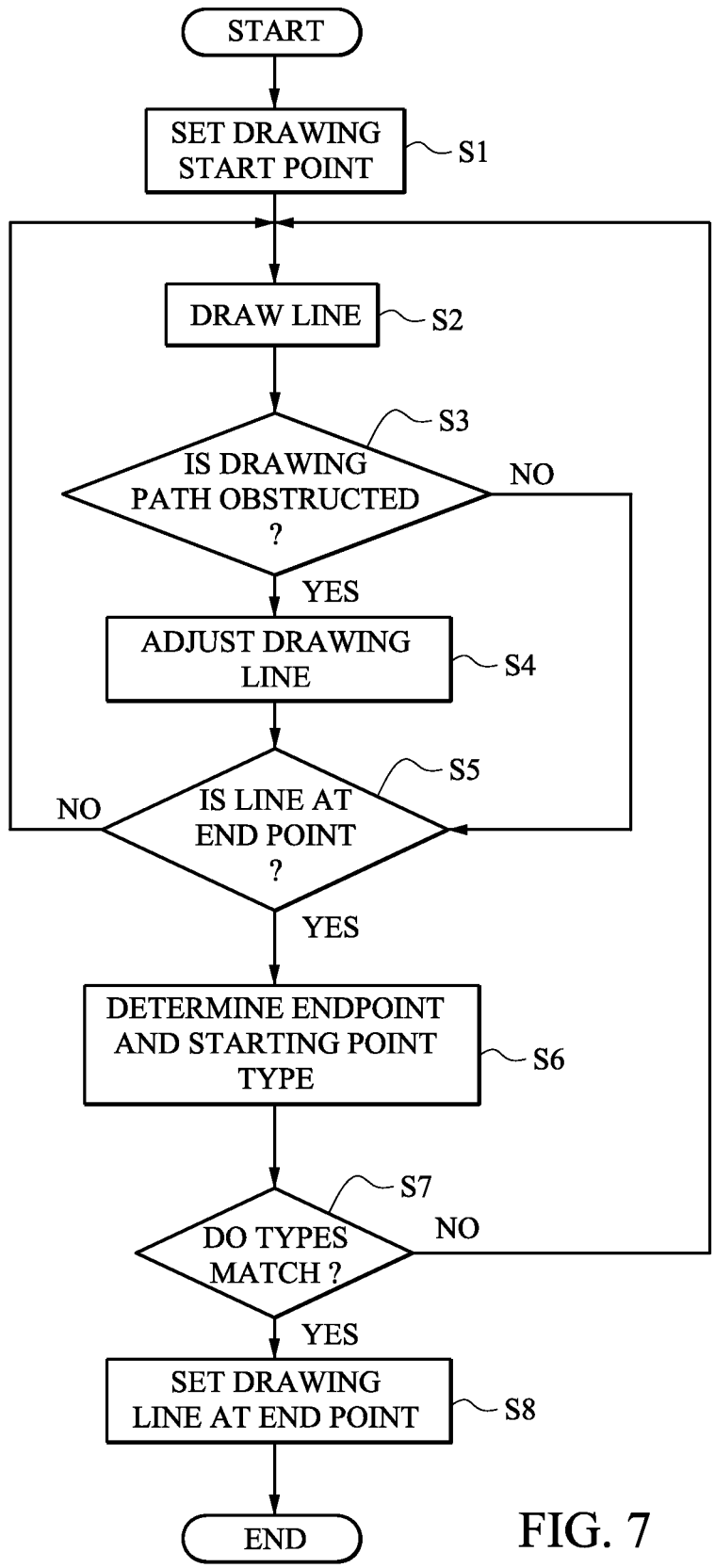
FIG. 7 illustrates an application flowchart for the present system.

FIG. 7 shows an example of an application flowchart of the present system. This flowchart describes the process of drawing a line between two objects. The system begins in S1 where a drawing start point is set. As discussed in the description of FIGS. 2-6, the drawing start point may be the drawing point at a first object, such as Object R1 as shown in FIGS. 2-6.

Once the drawing start point is set, the system proceeds to S2 where it begins drawing the line. As discussed above, the line will be drawn to correspond to the movement of a drawing object, such as a stylus. So for example, the farther the stylus moves from the drawing start point, the longer the line will appear on the display 10.

As the line is being drawn, the system advances to S3 where it determines if the drawing path is being obstructed. An example of an obstructed path can be found in FIGS. 5 and 6. If the path is obstructed the system proceeds to S4 where it adjusts the drawing line, as shown, for example, in FIGS. 5 and 6. If the path is not obstructed, the system proceeds to S5 where it determines if the drawing line is at an end point.

If the system determines that the line is not at an end point, the system goes back to S2 where it continues to draw the line. If the system determines that the line is at an end point, the system proceeds to S6 where it determines the start point type and the end point type. For example, the start point may be of type "R," as mentioned above and the end point may be of type "B."

Once the system has determined the start and end point types, the system proceeds to S7 where it determines if the types match. If the types do not match, the system goes back to S2 where it continues to draw the line. If the types match, the system proceeds to S8 where it sets the drawing line at the end point. That is, in S8, the system fixes the drawing line between the starting point and the ending point.

Figure 8A:
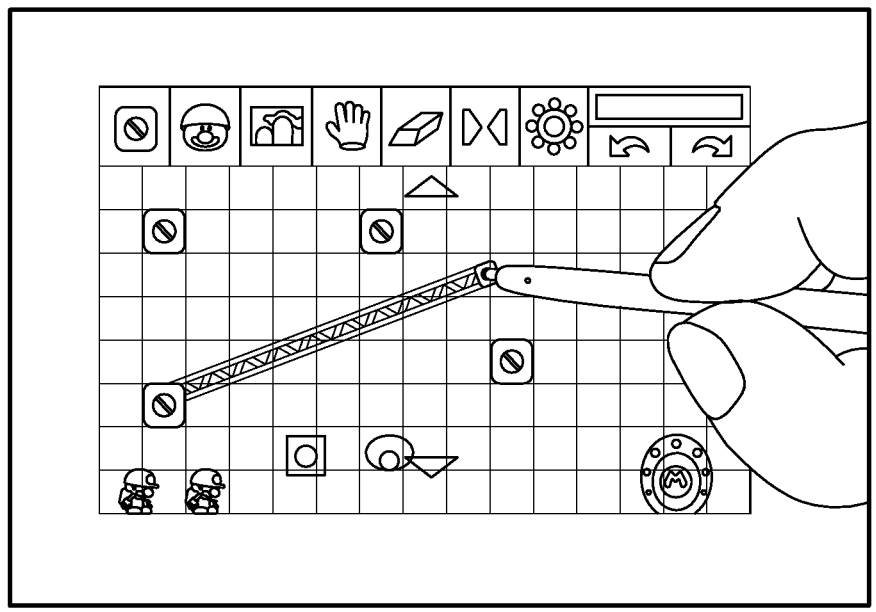
FIGS. 8A-B illustrate examples of an embodiment of the present system.
Figure 8B:
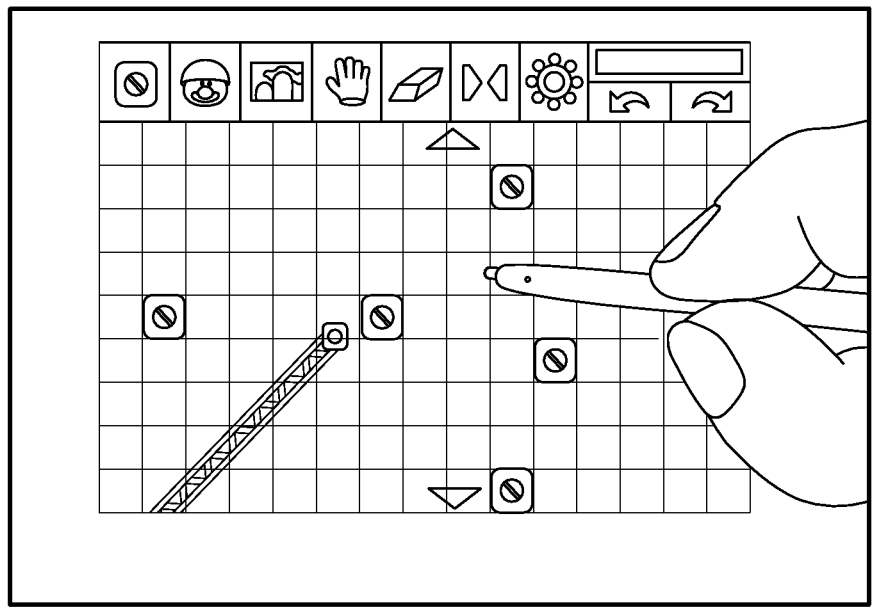

FIGS. 8A-B show an example of an embodiment of the present system. In FIG. 8A, the user is shown drawing a line from a starting point and extending the line away from the starting point. As can be seen in FIG. 8A, the drawing line extends from the object out as far as it is dragged by the stylus.

FIG. 8B shows an example where the stylus is moved upward from FIG. 8A. As can be seen in FIG. 8B, the stylus is attempting to connect the starting object with a "third" object. In order for the line to connect to the "third" object, it would have to bypass the intervening "second" object. As can be seen in FIG. 8B, the drawing line is adjusted or "truncated" at the "second" object to indicate that it cannot be drawn past the "second" object in that particular direction. Although not limited to this embodiment, the objects can be "rivets" and the lines that are drawn connecting the objects can be "girders" or "conveyor belts."

Figure 9A:
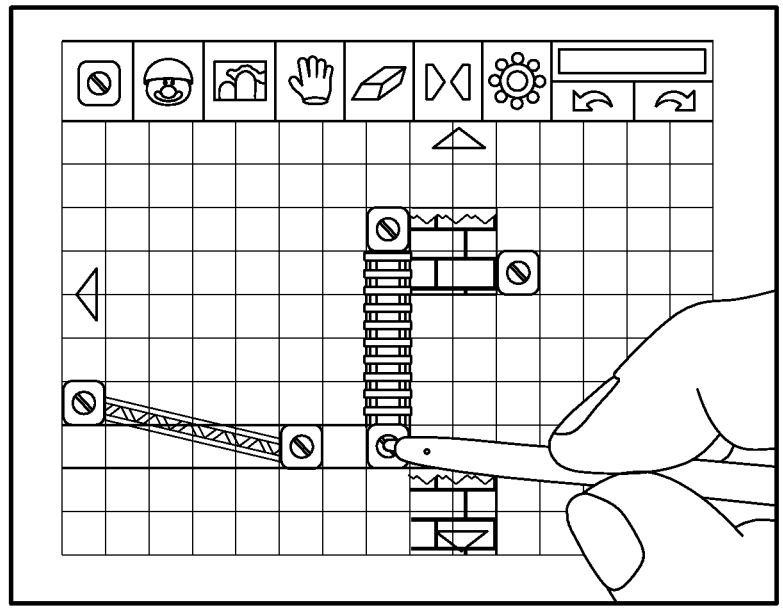
FIGS. 9A-B illustrate another example of an embodiment of the present system.
Figure 9B:
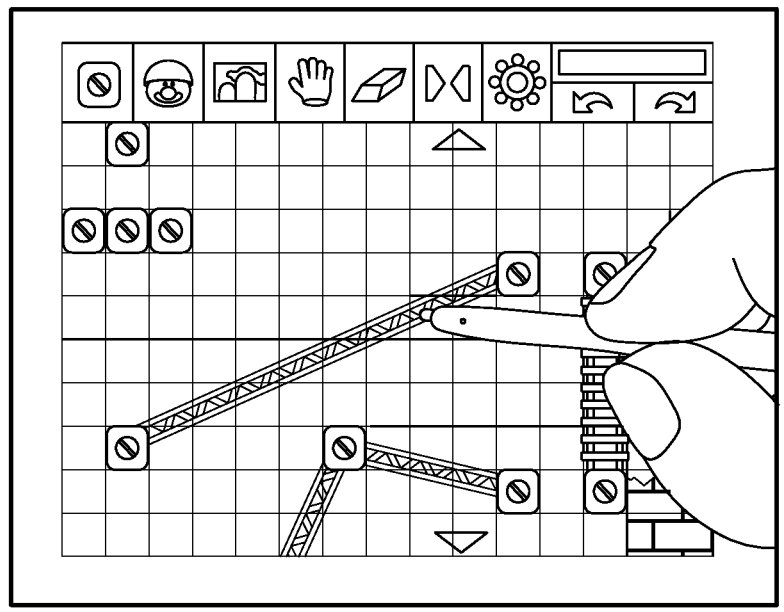

FIGS. 9A-B show another example of an embodiment of the present system. In FIG. 9A, the user is drawing a "ladder" from a first object to a second object. In this example, the drawing movement is restricted to "vertical" movement as described above. As such, as the user drags the stylus across the display, the "ladder" will only extend "up" and "down."

FIG. 9B shows an example where a user has connected the drawing line between objects. Here, a "conveyor" is being drawn from a starting object to an ending object. As the starting and ending objects are of the same type, the system will "set" the "conveyor" once the user has connected it to the ending object.

Figure 10A:
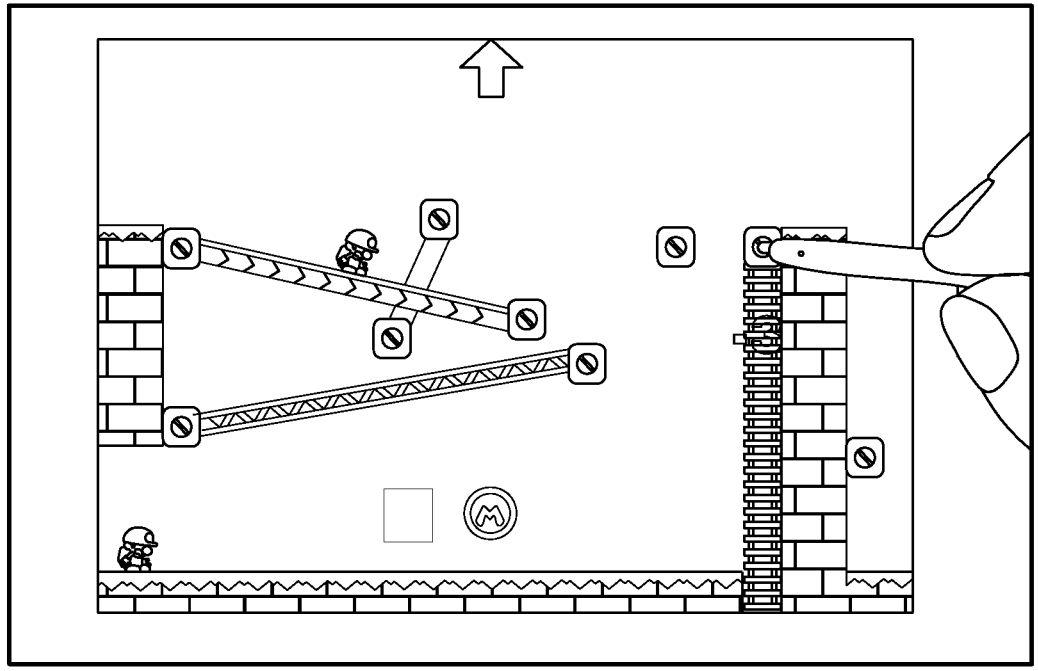
FIGS. 10A-B illustrate another example of an embodiment of the present system.
Figure 10B:
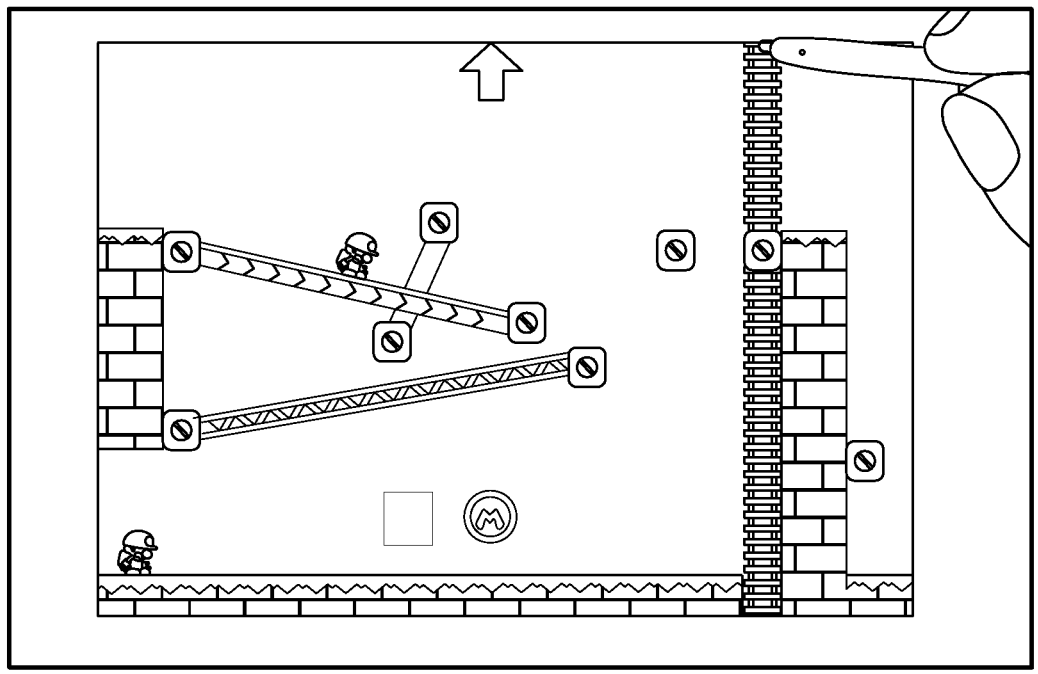

FIGS. 10A-B show examples of the virtual world editor being implemented in a game environment. In FIGS. 10A-B the virtual world that was created by the user is superimposed along a game backdrop and the user can manipulate the virtual world in real-time as the game plays.

FIG. 10A shows an example of a user drawing a "ladder" upward from an object while the player characters move on the screen. FIG. 10B shows the "ladder" extending from the object as the player characters move. The user can manipulate the components on the screen by tapping on the objects with a stylus. This allows the user to change the environment in real-time as the game plays so that the player character can be manipulated by the changed environment.

While the system has been described in connection with what is presently considered to be the most practical and preferred embodiment, it is to be understood that the system is not to be limited to the disclosed embodiment, but on the contrary, is intended to cover various modifications and equivalent arrangements included within the spirit and scope of the appended claims.

The invention claimed is:

1. A drawing method implemented using a user interface device having at least one processor and for interacting with a virtual world, the method comprising:
   defining a drawing start point, based on a first input on a display of the user interface device, for drawing a drawing object;
   defining a drawing end point, based on a second input on the display of the user interface device, for drawing the drawing object;
   determining, via the at least one processor, if a path from the drawing start point to the drawing end point for drawing the drawing object is obstructed at a point of obstruction;
   drawing the drawing object from the drawing start point to the drawing end point, the drawing object prevented from being drawn past the point of obstruction when the path from the drawing start point to the drawing end point is obstructed;
   generating the virtual world for display on the user interface; and
   animating one or more objects in the virtual world including the drawing object and displaying the virtual world, including the animated one or more objects, on the display of the user interface device.

2. The drawing method of claim 1, further comprising:
   positioning a first object of a first type on the display;
   positioning a second object of a second type on the display, the second object being at a different position than the first object; and
   positioning a third object of the first type on the display, the third object being at a different position than both the first and second objects,
   wherein the first and second types are different from each other.

3. The drawing method of claim 2, wherein
   the first object represents the drawing start point and the third object represents the drawing end point, and
   the second object is in a path between the first and third object.

4. The drawing method of claim 3, wherein the drawing object will be prevented from drawing from the first object to the third object if an object of a different type obstructs a path between the first object and the third object.

5. The drawing method of claim 3, wherein the drawing object will not draw past the second object as the drawing object is being drawn toward the third object.

6. The drawing method of claim 2, wherein the drawing of the drawing object will be completed when the drawing object draws from the first object to the third object and the first and third objects are of a same type.

7. The drawing method of claim 2, wherein the first object, the second object, and the third object are selected from a menu.

8. A non-transitory computer readable storage medium having computer readable code embodied therein for drawing objects on a display of a user interface device, comprising:
   defining a drawing start point, based on a first input on a display of the user interface device, for drawing a drawing object;
   defining a drawing end point, based on a second input on the display of the user interface device, for drawing the drawing object;
   determining if a path from the drawing start point to the drawing end point for drawing the drawing object is obstructed at a point of obstruction;
   drawing the drawing object from the drawing start point to the drawing end point, the drawing object prevented from being drawn past the point of obstruction when the path from the drawing start point to the drawing end point is obstructed;
   generating the virtual world for display on the user interface; and
   animating one or more objects in the virtual world including the drawing object and displaying the virtual world, including the animated one or more objects, on the display of the user interface device.

9. The non-transitory computer readable storage medium of claim 8, further comprising:
   positioning a first object of a first type on the display;
   positioning a second object of a second type on the display, the second object being at a different position than the first object; and
   positioning a third object of the first type on the display, the third object being at a different position than both the first and second objects,
   wherein the first and second types are different from each other.

10. The non-transitory computer readable storage medium of claim 9, wherein
the first object represents the drawing start point and the third object represents the drawing end point, and
the second object is in a path between the first and third object.

11. The non-transitory computer readable storage medium of claim 10, wherein the drawing object will be prevented from drawing from the first object to the third object if an object of a different type obstructs a path between the first object and the third object.

12. The non-transitory computer readable storage medium of claim 10, wherein the drawing object will not draw past the second object as the drawing object is being drawn toward the third object.

13. The non-transitory computer readable storage medium of claim 9, wherein the drawing of the drawing object will be completed when the drawing object draws from the first object to the third object and the first and third objects are of a same type.

14. The non-transitory computer readable storage medium of claim 9, wherein the first object, the second object, and the third object are selected from a menu.

15. A user interface apparatus, comprising:
a display for drawing a drawing object; and
a processing system having at least one processor, the processing system configured to draw the drawing object on the display and interact with a virtual world, the processing system configured to:
define a drawing start point, based on a first input on the display of the user interface apparatus, for drawing a drawing object,
define a drawing end point, based on a second input on the display of the user interface apparatus, for drawing the drawing object,
determine if a path from the drawing start point to the drawing end point for drawing the drawing object is obstructed at a point of obstruction,
draw the drawing object from the drawing start point to the drawing end point, the drawing object prevented from being drawn past the point of obstruction when the path from the drawing start point to the drawing end point is obstructed,
generate the virtual world for display on the user interface, and
animate one or more objects in the virtual world including the drawing object and display the virtual world, including the animated one or more objects, on the display of the user interface apparatus.

16. The user interface apparatus of claim 15, wherein the one or more processors are further configured to:
position a first object of a first type on the display;
position a second object of a second type on the display, the second object being at a different position than the first object; and
position a third object of the first type on the display, the third object being at a different position than both the first and second objects,
wherein the first and second types are different from each other.

17. The user interface apparatus of claim 16, wherein
the first object represents the drawing start point and the third object represents the drawing end point, and
the second object is in a path between the first and third object.

18. The user interface apparatus of claim 17, wherein the drawing object will be prevented from drawing from the first object to the third object if an object of a different type obstructs a path between the first object and the third object.

19. The user interface apparatus of claim 17, wherein the drawing object will not draw past the second object as the drawing object is being drawn toward the third object.

20. The user interface apparatus of claim 16, wherein the drawing of the drawing object will be completed when the drawing object draws from the first object to the third object and the first and third objects are of a same type.

21. The user interface apparatus of claim 16, wherein the first object, the second object, and the third object are selected from a menu.

22. A drawing method implemented using a user interface device having at least one processor and for interacting with a virtual world, the method comprising:
drawing a grid-shaped area on a display of the user interface device having a horizontal and a vertical coordinate space;
defining a first position of a first object having a first type in a first coordinate space in the grid-shaped area;
defining a second position of a second object having a second type in a second coordinate space in the grid-shaped area;
defining a third position of a third object having the first type in a third coordinate space in the grid-shaped area;
determining if a path from the first position to the third position is obstructed by the second object at the second position;
drawing a drawing object from the first position to the third position, the drawing object prevented from being drawn past the second position when the path from the first position to the third position is obstructed by the second object at the second position;
replacing the drawn grid-shaped area on the display of the user interface device with the virtual world; and
animating one or more objects in the virtual world including the drawing object and displaying the virtual world, including the animated one or more objects, on the display of the user interface device.

23. The drawing method of claim 22, wherein the drawing object is prevented from being drawn past the second position when the first object and the second object are of a different type.

24. The drawing method of claim 22, wherein
multiple drawing objects can be drawn in the grid-shaped area, and
after all drawing objects are drawn in the grid-shaped area, the grid-shaped area is removed from the display and the drawing objects are superimposed on a background of a game image of the virtual world.

25. The drawing method of claim 24, wherein one or more player characters traverse the multiple drawing objects in a game using the background and the multiple drawing objects in the game image of the virtual world.

26. The drawing method of claim 1, wherein the drawing object is drawn in response to user input to a surface of the display of the user interface device.

* * * * *